US012215601B2

(12) United States Patent
Ghigliotty Rosado et al.

(10) Patent No.: US 12,215,601 B2
(45) Date of Patent: Feb. 4, 2025

(54) AIR FOIL WITH STAGGERED COOLING HOLE CONFIGURATION

(71) Applicant: RTX Corporation, Farmington, CT (US)

(72) Inventors: Jaime G. Ghigliotty Rosado, Cabo Rojo, PR (US); Brandon W. Spangler, Vernon, CT (US); Tracy A. Propheter-Hinckley, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/170,810

(22) Filed: Feb. 17, 2023

(65) Prior Publication Data

US 2024/0280025 A1 Aug. 22, 2024

(51) Int. Cl.
*F01D 5/18* (2006.01)

(52) U.S. Cl.
CPC ........ *F01D 5/186* (2013.01); *F05D 2240/301* (2013.01); *F05D 2240/303* (2013.01); *F05D 2260/201* (2013.01); *F05D 2260/202* (2013.01)

(58) Field of Classification Search
CPC . F01D 5/18; F01D 5/186; F01D 5/187; F01D 25/12; F05D 2240/301;
(Continued)

(56) References Cited

U.S. PATENT DOCUMENTS 5,246,340 A 9/1993 Winstanley et al.
6,206,638 B1 3/2001 Glynn et al.
(Continued)

FOREIGN PATENT DOCUMENTS

EP 3399145 B1 8/2021

OTHER PUBLICATIONS

Extended European Search Report for EP Application No. 24158469.7; Issue Date, Jun. 13, 2024.

*Primary Examiner* — Woody A Lee, Jr.
*Assistant Examiner* — Justin A Pruitt
(74) *Attorney, Agent, or Firm* — CANTOR COLBURN LLP

(57) ABSTRACT

A turbine blade for a gas turbine engine, including: an airfoil, the having a leading edge, a pressure side, a suction side and a trailing edge; a plurality of internal cooling cavities including a leading edge cavity, a leading edge feed passage, pressure side cooling passages, suction side cooling passages and main body cavities; the leading edge cavity extending towards the suction side; a first crossover row of cooling passages providing fluid communication between the leading edge cavity and the leading edge feed passage; and a second crossover row of cooling passages providing fluid communication between the leading edge cavity and the leading edge feed passage, a centerline of the first crossover row of cooling passages is located closer to the pressure side than a centerline of the second crossover row of cooling passages and the centerline of the second crossover row of cooling passages is located closer to the suction side than the centerline of the first crossover row of cooling passages, and wherein the second crossover row of cooling passages are radially staggered relative to the first crossover row of cooling passages.

15 Claims, 6 Drawing Sheets

(58) Field of Classification Search
CPC ......... F05D 2240/303; F05D 2260/201; F05D 2260/202
USPC ........................................................... 416/95
See application file for complete search history.

(56) References Cited

U.S. PATENT DOCUMENTS

| | | | | |
|---|---|---|---|---|
| 9,296,039 | B2 * | 3/2016 | Propheter-Hinckley | B22F 3/105 |
| 9,932,836 | B2 | 4/2018 | Schnieder et al. | |
| 10,145,246 | B2 * | 12/2018 | Lewis | F01D 25/12 |
| 10,208,603 | B2 * | 2/2019 | Xu | F01D 5/187 |
| 10,822,963 | B2 | 11/2020 | Spangler et al. | |
| 11,053,850 | B2 * | 7/2021 | Choi | F02C 7/18 |
| 11,111,857 | B2 | 9/2021 | Spangler | |
| 11,220,912 | B2 | 1/2022 | Spangler | |
| 2017/0081958 | A1 | 3/2017 | Xu et al. | |
| 2018/0306038 | A1 | 10/2018 | Lewis et al. | |

* cited by examiner

AIR FOIL WITH STAGGERED COOLING HOLE CONFIGURATION

BACKGROUND

This disclosure relates to gas turbine engines, and more particularly to an airfoil that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Turbine airfoils can be operating in a gas-path temperature far exceeding their melting point. To endure these temperatures, they must be cooled to an acceptable service temperature in order to maintain their integrity.

BRIEF DESCRIPTION

Disclosed is a turbine blade for a gas turbine engine, including: an airfoil, the having a leading edge, a pressure side, a suction side and a trailing edge; a plurality of internal cooling cavities including a leading edge cavity, a leading edge feed passage, pressure side cooling passages, suction side cooling passages and main body cavities; the leading edge cavity extending towards the suction side; a first crossover row of cooling passages providing fluid communication between the leading edge cavity and the leading edge feed passage; and a second crossover row of cooling passages providing fluid communication between the leading edge cavity and the leading edge feed passage, a centerline of the first crossover row of cooling passages is located closer to the pressure side than a centerline of the second crossover row of cooling passages and the centerline of the second crossover row of cooling passages is located closer to the suction side than the centerline of the first crossover row of cooling passages, and wherein the second crossover row of cooling passages are radially staggered relative to the first crossover row of cooling passages.

In addition to one or more of the features described above, or as an alternative to any of the foregoing embodiments, the first crossover row of cooling passages and the second crossover row of cooling passages are angled with respect to a horizontal line extending between the leading edge cavity and the leading edge feed passage.

In addition to one or more of the features described above, or as an alternative to any of the foregoing embodiments, the leading edge cavity proximate to the suction side is provided with an impingement cooling benefit from the second crossover row of cooling passages.

In addition to one or more of the features described above, or as an alternative to any of the foregoing embodiments, the centerline of the first crossover row of cooling passages and the centerline of the second crossover row of cooling passages intersects the leading edge cavity at a point forward of a line parallel to a pull angle or edge of the leading edge feed passage.

In addition to one or more of the features described above, or as an alternative to any of the foregoing embodiments, the centerline of the first crossover row of cooling passages and the centerline of the second crossover row of cooling passages intersects a vertex of the leading edge feed passage and the centerline of the first crossover row of cooling passages and the centerline of the second crossover row of cooling passages are each aligned with an angle gamma (γ) with respect to a horizontal line extending from the vertex of the leading edge feed passage to the vertex of the leading edge cavity, wherein the angle gamma (γ) of the first crossover row of cooling passages is less than or equal to a pull angle alpha (α) of a rib for forming the first crossover row of cooling passages, the pull angle alpha (α) being relative to the horizontal line extending from the vertex of the leading edge feed passage to the vertex of the leading edge cavity and the angle gamma (γ) of the second crossover row of cooling passages is less than or equal to a pull angle beta (β) of a rib for forming the second crossover row of cooling passages, the pull angle beta (β) being relative to the horizontal line extending from the vertex of the leading edge feed passage to the vertex of the leading edge cavity.

In addition to one or more of the features described above, or as an alternative to any of the foregoing embodiments, the first crossover row of cooling passages and the second crossover row of cooling passages taper into the leading edge feed passage.

In addition to one or more of the features described above, or as an alternative to any of the foregoing embodiments, at least one of the first crossover row of cooling passages and the second crossover row of cooling passages do not extend all the way to an exterior wall of the airfoil.

Also disclosed is a gas turbine engine including: a compressor section; a combustor fluidly connected to the compressor section; a turbine section fluidly connected to the combustor, the turbine section including: a high pressure turbine coupled to a high pressure compressor of the compressor section via a shaft; a low pressure turbine; and wherein the high pressure turbine includes a turbine disk with a plurality of turbine blades secured thereto each of the plurality of turbine blades, including: an airfoil, the having a leading edge, a pressure side, a suction side and a trailing edge; a plurality of internal cooling cavities including a leading edge cavity, a leading edge feed passage, pressure side cooling passages, suction side cooling passages and main body cavities; the leading edge cavity extending towards the suction side; a first crossover row of cooling passages providing fluid communication between the leading edge cavity and the leading edge feed passage; and a second crossover row of cooling passages providing fluid communication between the leading edge cavity and the leading edge feed passage, a centerline of the first crossover row of cooling passages is located closer to the pressure side than a centerline of the second crossover row of cooling passages and the second crossover row of cooling passages is located closer to the suction side than the centerline of the first crossover row of cooling passages, and wherein the second crossover row of cooling passages are radially staggered relative to the first crossover row of cooling passages.

In addition to one or more of the features described above, or as an alternative to any of the foregoing embodiments, the first crossover row of cooling passages and the second crossover row of cooling passages are angled with respect to a horizontal line extending between the leading edge cavity and the leading edge feed passage.

In addition to one or more of the features described above, or as an alternative to any of the foregoing embodiments, the leading edge cavity proximate to the suction side is provided with an impingement cooling benefit from the second crossover row of cooling passages.

In addition to one or more of the features described above, or as an alternative to any of the foregoing embodiments, the centerline of the first crossover row of cooling passages and the centerline of the second crossover row of cooling passages intersects the leading edge cavity at a point forward of a line parallel to a pull angle or edge of the leading edge feed passage.

In addition to one or more of the features described above, or as an alternative to any of the foregoing embodiments, the centerline of the first crossover row of cooling passages and the centerline of the second crossover row of cooling passages intersects a vertex of the leading edge feed passage.

In addition to one or more of the features described above, or as an alternative to any of the foregoing embodiments, the first crossover row of cooling passages and the second crossover row of cooling passages taper into the leading edge feed passage.

In addition to one or more of the features described above, or as an alternative to any of the foregoing embodiments, at least one of the first crossover row of cooling passages and the second crossover row of cooling passages do not extend all the way to an exterior wall of the airfoil.

Also disclosed is a method for forming an airfoil of a turbine blade, including: forming a plurality of internal cooling cavities in the airfoil, the plurality of internal cooling cavities including a leading edge cavity, a leading edge feed passage, pressure side cooling passages, suction side cooling passages and main body cavities; the leading edge cavity extending towards the suction side, the airfoil, the having a leading edge, a pressure side, a suction side and a trailing edge; forming a first crossover row of cooling passages providing fluid communication between the leading edge cavity and the leading edge feed passage; and forming a second crossover row of cooling passages providing fluid communication between the leading edge cavity and the leading edge feed passage, a centerline of the first crossover row of cooling passages is located closer to the pressure side than a centerline of the second crossover row of cooling passages and the centerline of the second crossover row of cooling passages is located closer to the suction side than the centerline of the first crossover row of cooling passages, and wherein the second crossover row of cooling passages are radially staggered relative to the first crossover row of cooling passages.

In addition to one or more of the features described above, or as an alternative to any of the foregoing embodiments, the first crossover row of cooling passages and the second crossover row of cooling passages are angled with respect to a horizontal line extending between the leading edge cavity and the leading edge feed passage.

In addition to one or more of the features described above, or as an alternative to any of the foregoing embodiments, the leading edge cavity proximate to the suction side is provided with an impingement cooling benefit from the second crossover row of cooling passages.

In addition to one or more of the features described above, or as an alternative to any of the foregoing embodiments, the centerline of the first crossover row of cooling passages and the centerline of the second crossover row of cooling passages intersects the leading edge cavity at a point forward of a line parallel to a pull angle or edge of the leading edge feed passage.

In addition to one or more of the features described above, or as an alternative to any of the foregoing embodiments, the centerline of the first crossover row of cooling passages and the centerline of the second crossover row of cooling passages intersects a vertex of the leading edge feed passage.

In addition to one or more of the features described above, or as an alternative to any of the foregoing embodiments, the first crossover row of cooling passages and the second crossover row of cooling passages taper into the leading edge feed passage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
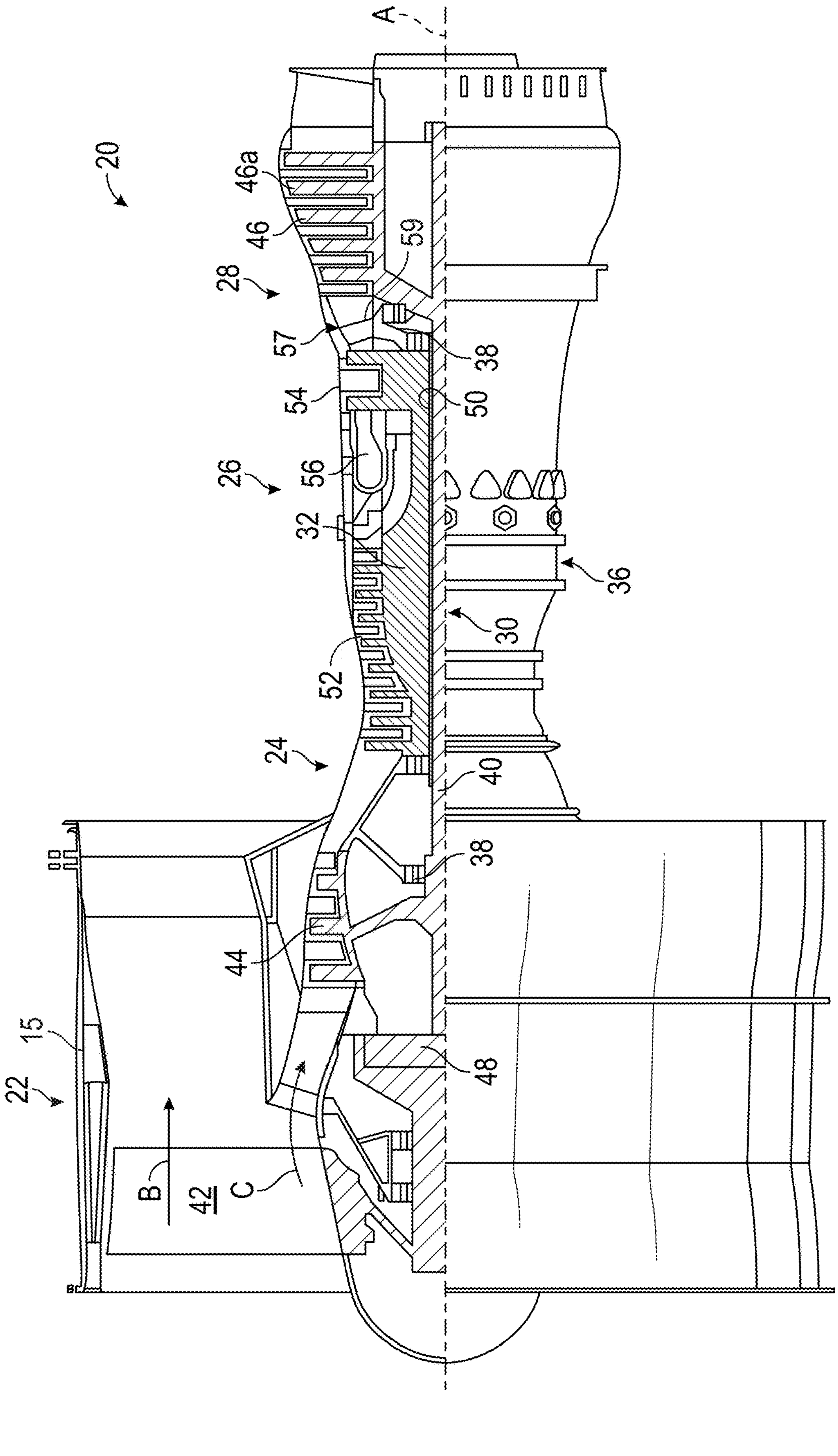
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150 ft/second (350.5 m/sec).

In one non-limiting example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at **46*a*. In a further non-limiting example the low pressure turbine 46 includes about 3 turbine rotors. A ratio between the number of blades of the fan 42 and the number of low pressure turbine rotors 46*a* is between about 3.3 and about 8.6. The example low pressure turbine 46 provides the driving power to rotate the fan section 22 and therefore the relationship between the number of turbine rotors 46*a* in the low pressure turbine 46 and the number of blades in the fan section 22 discloses an example gas turbine engine 20** with increased power transfer efficiency.

Figure 2:
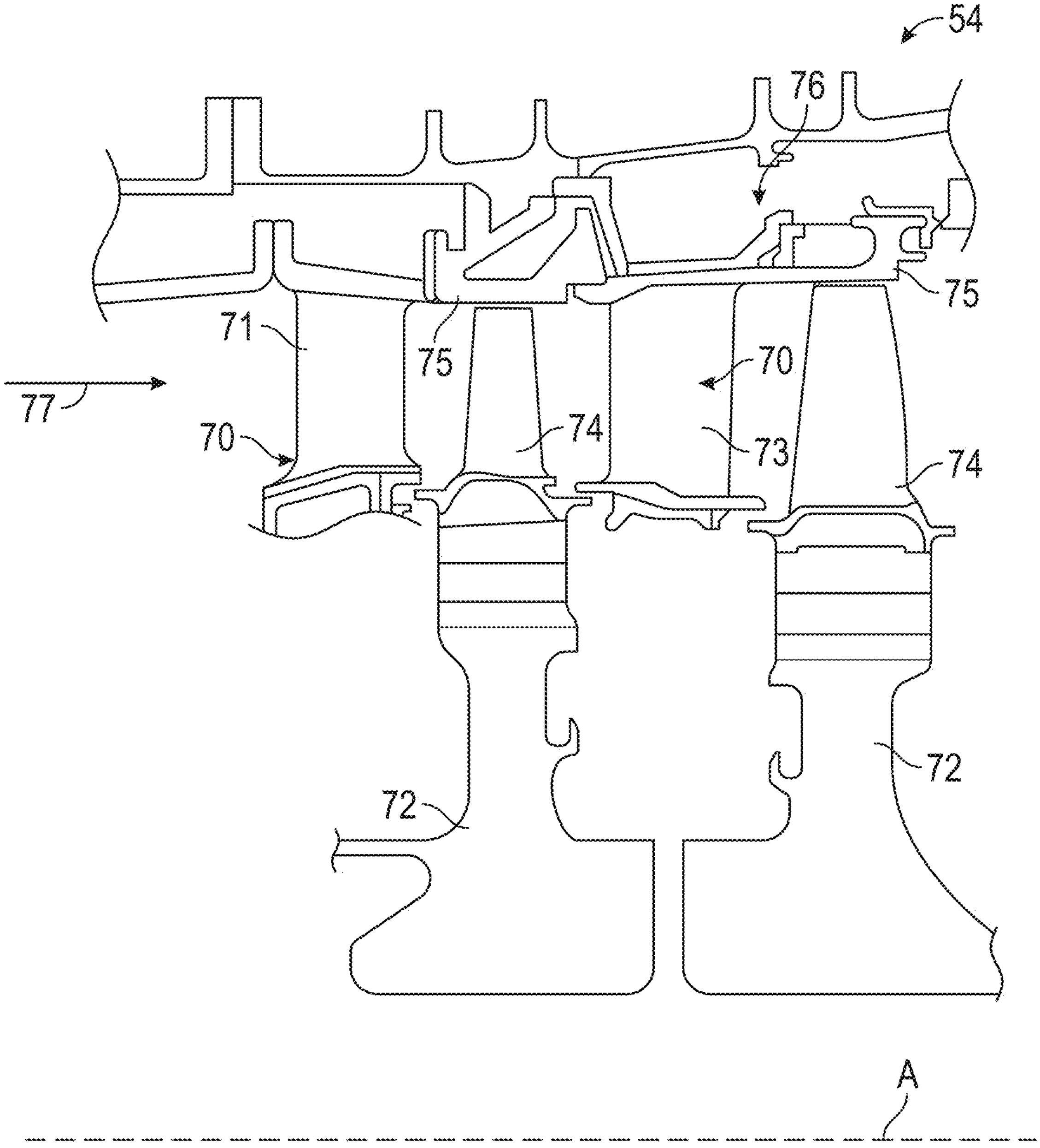
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 71) is located forward of a first one of a pair of turbine disks 72 each having a plurality of turbine blades 74 secured thereto. The turbine blades 74 rotate proximate to blade outer air seals (BOAS) 75 which are located aft of the first stage vane 71. The other vane 70 is located between the pair of turbine disks 72. This vane 70 may be referred to as the second stage vane 73. As used herein the first stage vane 71 is the first vane of the high pressure turbine section 54 that is located aft of the combustor section 26 and the second stage vane 73 is located aft of the first stage vane 71 and is located between the pair of turbine disks 72. In addition, blade outer air seals (BOAS) 75 are disposed between the first stage vane 71 and the second stage vane 73. The high pressure turbine stage vanes 70 (e.g., first stage vane 71 or second stage vane 73) are one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

The high pressure turbine (HPT) is subjected to gas temperatures well above the yield capability of its material. In order to mitigate such high temperature detrimental effects, surface film-cooling is typically used to cool the blades and vanes of the high pressure turbine. Surface film-cooling is achieved by supplying cooling air from the cold backside through cooling holes drilled on the high pressure turbine components. Cooling holes are strategically designed and placed on the vane and turbine components in-order to maximize the cooling effectiveness and minimize the efficiency penalty.

In addition, internal cooling passageways and interconnecting cooling openings or crossovers are provided to allow for cooling air flow within the blades and vanes of the high pressure turbine.

Figure 3:
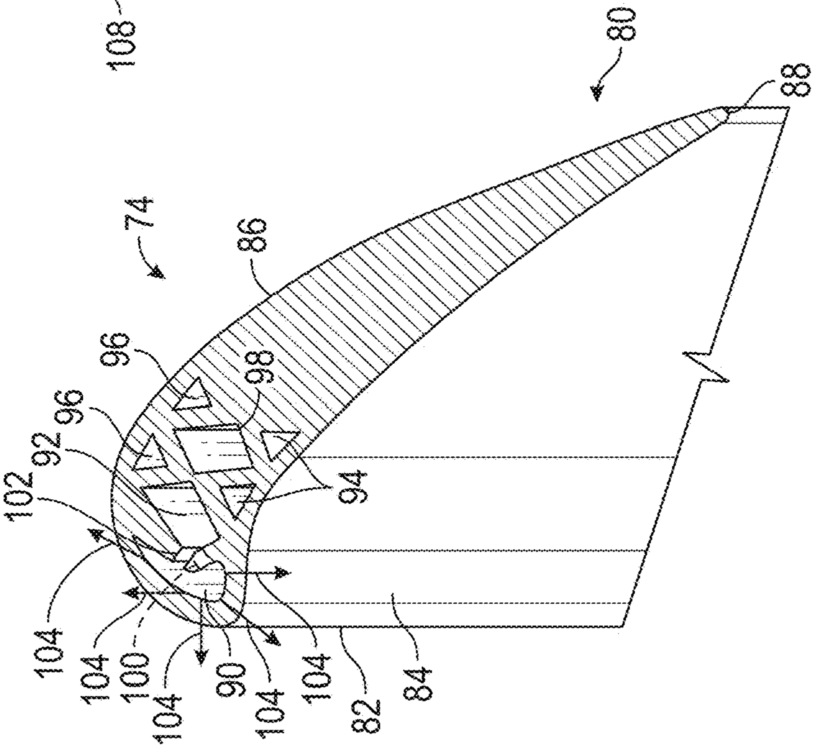
FIG. 3 is a partial perspective cross-sectional view of a portion of a turbine blade according to an embodiment of the present disclosure.

Referring now to at least FIGS. 1-3, a portion of an airfoil 80 of a turbine blade 74 is illustrated. The airfoil 80 has a leading edge 82, a pressure side 84, a suction side 86 and a trailing edge 88. The airfoil 80 also has a plurality of internal cooling cavities which include a leading edge cavity 90, a leading edge feed passage 92, pressure side cooling passages 94, suction side cooling passages 96 and main body cavities 98. As illustrated, the leading edge cavity 90 extends towards the suction side 86 of the airfoil 80.

In order to provide fluid communication to the leading edge cavity 90, a first crossover row of cooling passages 100 are provided to allow for fluid communication between the leading edge cavity 90 and the leading edge feed passage 92. In addition, a second crossover row of cooling passages 102 are also provided to allow for fluid communication between the leading edge cavity 90 and the leading edge feed passage 92.

The first crossover row of cooling passages 100 are located closer to the pressure side 84 than the second crossover row of cooling passages 102. In addition, the second crossover row of cooling passages 102 are located closer to the suction side 86 than the first crossover row of cooling passages 100. As such, a centerline of the first crossover row of cooling passages 100 is located closer to the pressure side 84 than a centerline of the second crossover row of cooling passages 102. In addition, the centerline of the second crossover row of cooling passages 102 is located closer to the suction side 86 than the centerline of the first crossover row of cooling passages 100. In addition, the second crossover row of cooling passages 102 are radially staggered relative to the first crossover row of cooling passages 100.

Still further, the first crossover row of cooling passages 100 and the second crossover row of cooling passages 102 are angled with respect to a horizontal line extending between the leading edge cavity 90 and the leading edge feed passage 92, which in one embodiment may be a line extending from a vertex of the leading edge cavity 90 and a vertex of the leading edge feed passage 92.

By employing the first crossover row of cooling passages 100 and the second crossover row of cooling passages 102, the entire leading edge cavity 90 is able to get an impingement cooling benefit from the leading edge feed passage 92 as illustrated by arrows 104.

It should be noted that other cooling passages are contemplated to be located in the airfoil 80 and the attached FIGS. merely illustrate crossover row holes for providing fluid communication between the leading edge cavity 90 and the leading edge feed passage 92.

Figure 5:
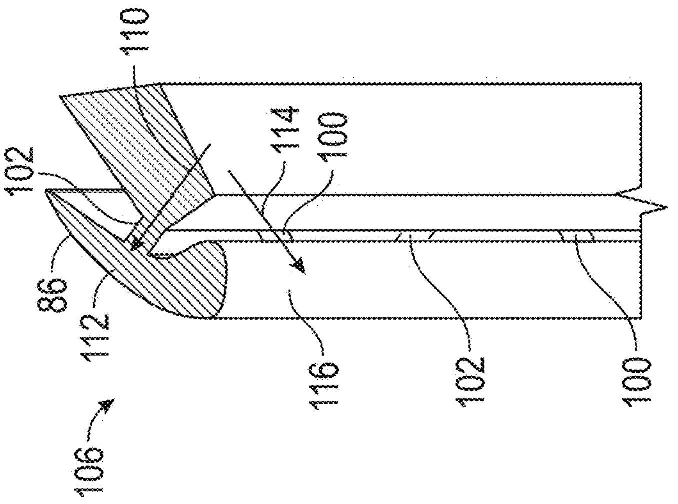
FIGS. 4 and 5 are partial perspective cross-sectional views of a core for forming a turbine blade according to an embodiment of the present disclosure.
Figure 4:
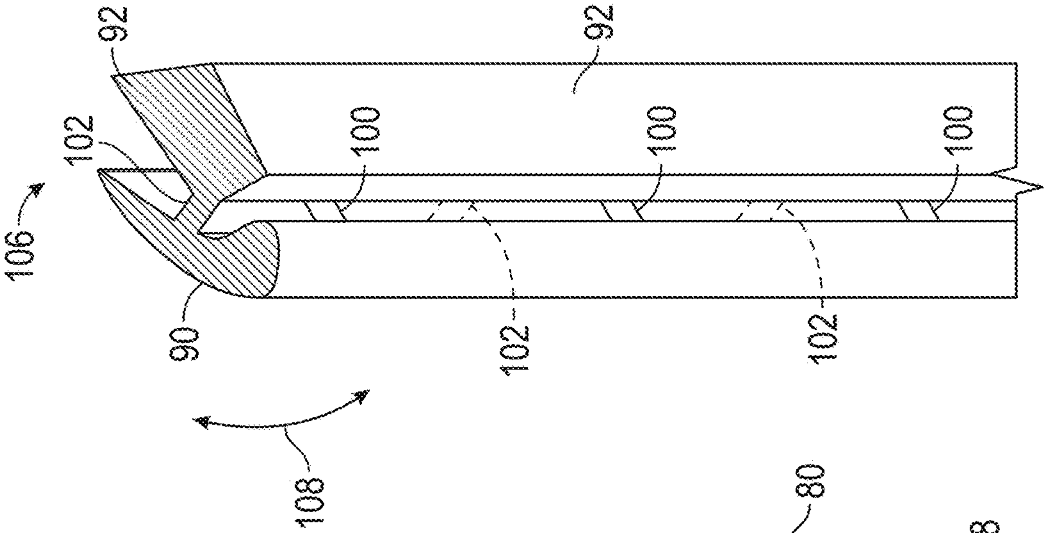

Referring now to FIGS. 4 and 5, a portion of a core 106 for forming the leading edge cavity 90, the first crossover row of cooling passages 100, the second crossover row of cooling passages 102 and the leading edge feed passage 92 is illustrated.

As is known in the related arts, the core 106 is used for manufacturing the airfoil 80. In other words, the core 106 will resemble the internal cavities of the airfoil 80 that is cast about the core 106. Thereafter, the core 106 is removed in accordance with known technologies. It being understood, that the materials shown in FIGS. 4 and 5 of core 106 is the material that when removed will form the leading edge cavity 90, the first crossover row of cooling passages 100, the second crossover row of cooling passages 102, the leading edge feed passage 92, pressure side cooling passages 94, suction side cooling passages 96 and main body cavities 98 illustrated in at least FIGS. 3 and 7.

By employing both the first crossover row of cooling passages 100 and the second crossover row of cooling passages 102, the core 106 is less prone to breakage along the portions of the core 106 that will ultimately form the cooling passages 100 and 102. For example, if a bending moment is applied in the direction of arrows 108 to the portion of the core 106 that forms the leading edge cavity 90, there is a lesser chance of breaking of the portions of the core 106 forming the cooling passages 100 and 102 as opposed to a core only having a single row of cooling passages.

As mentioned above and as illustrated in FIG. 4, the portions of the core 106 forming the cooling passages are bent or angled with respect to a horizontal line extending from the leading edge cavity 90 to the leading edge feed passage 92, which in one embodiment may be a line extending from a vertex of the leading edge cavity 90 and a vertex of the leading edge feed passage 92. By radially staggering the rows of cooling holes 100 or 102 or in other words the portions of the core 106 that form these cooling holes 100 and 102 the crossovers holes 100 or 102 can be located to maximize cooling in areas where high heat transfer is required and still provide a means for conventionally creating the cores in a core die.

For example and by employing the crossover passages 102 an approximate three time increase in heat transfer is achieved in areas of the leading edge cavity 90 proximate to the suction side 86 of the airfoil 80.

Referring now to FIG. 5, impingement flow directed to the suction side 86 of the airfoil 80 through at least one crossover passage 102 is illustrated by arrow 110 and reference line 112. Reference line 112 illustrates an area where cooling airflow is applied via the corresponding crossover passage 102. In addition, impingement flow directed to the pressure side 84 of the airfoil 80 through at least one crossover passage 100 is illustrated by arrow 114 and reference line 116. Reference line 116 illustrates an area where cooling airflow is applied via the corresponding crossover passage 100.

The two staggered rows of crossover passages or openings 100 and 102 allow for a more producible design as the core 106 will be less prone to breaking as discussed above.

Accordingly, the present disclosure allows for direct impingement cooling into the airfoil leading edge and suction side. In addition, and as will be described below the design is manufacturable through conventional casting processes where core dies can be pulled without die locking.

Figure 6:
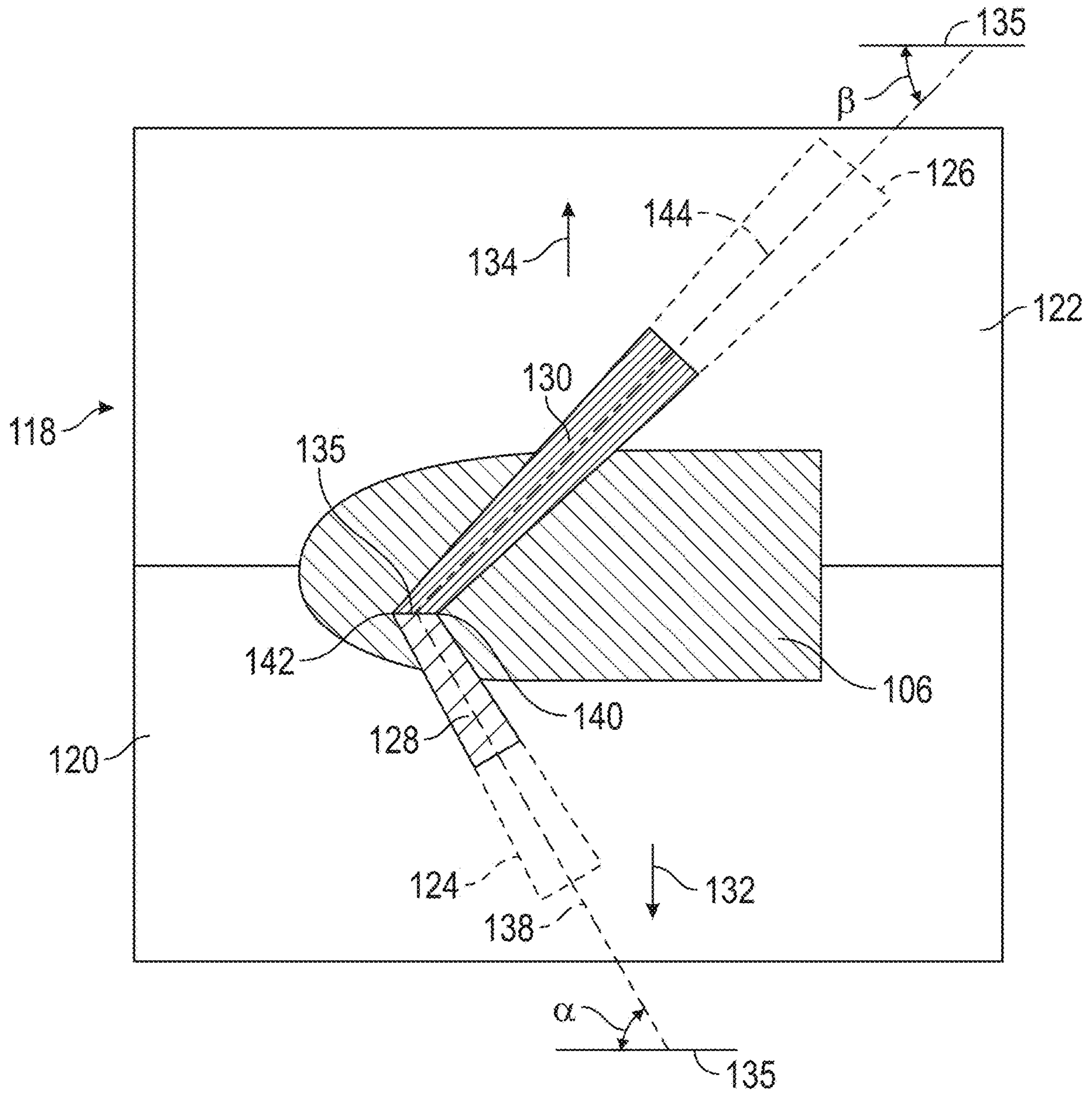
FIG. 6 illustrates a tool for forming a core for forming a turbine blade according to an embodiment of the present disclosure.
Figure 7:
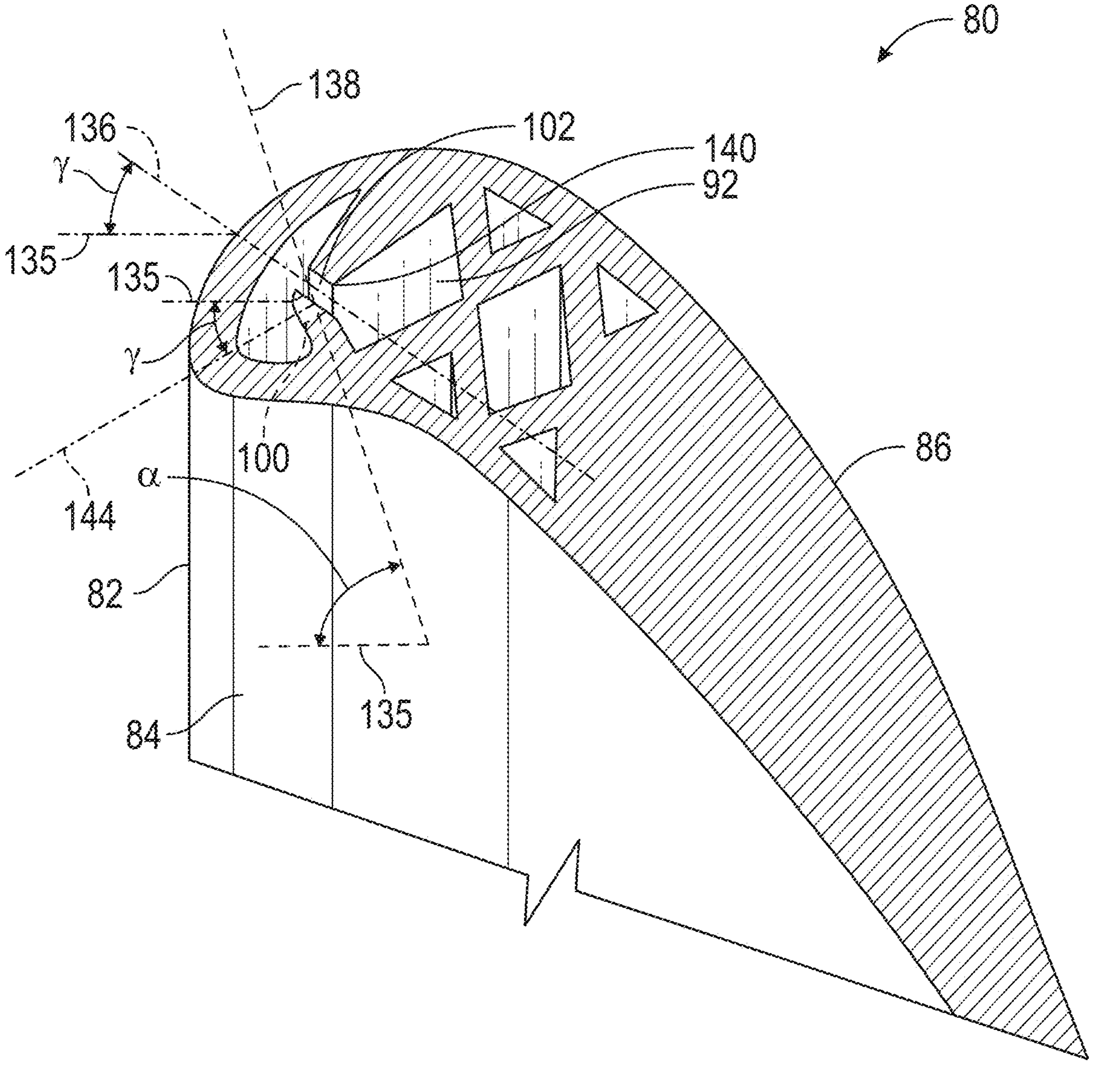
FIG. 7 illustrates a partial cross-sectional perspective view of a portion of a turbine blade formed in accordance with the present disclosure.

Referring now to FIGS. 6-7, examples of how the core 106 is formed with the crossover passages 100 and 102 in accordance with the present disclosure without die locking is illustrated.

In FIG. 6, the airfoil core 106 is cast in a core die 118 having a first block 120 and a second block 122. Each of the first and second blocks 120, 122 has at least one pocket 124 and 126 for receipt of sliding ribs 128 and 130, which are received in pockets 124 and 126 prior to blocks 120 and 122 being moved away from each other in the direction of arrows 132 and 134. Rib 128 of the core die is configured to form portions of the core 106 that forming cooling passages 100 and rib 128 is pulled into the pocket 124 at a pull angle alpha ($\alpha$) relative to a line 135 that extends from a vertex 140 of the leading edge feed passage 92 to a vertex 142 of the leading edge cavity 90. Likewise rib 130 is configured to form portions of the core 106 that forming cooling passages 102 and rib 130 is pulled into pocket 126 at a pull angle beta ($\beta$) relative to the line 135.

Referring now to FIG. 7 and in one embodiment and in order to ensure there is no locking of sliding ribs 128 and 130 during formation of the core 106, a centerline 136 of the crossover passageways 102 has angle gamma ($\gamma$) with respect to line 135 and intersects the leading edge cavity 90 at a point forward of a line 138, which is parallel to the pull angle alpha ($\alpha$) or a forward edge of the leading edge feed passage 92. In addition, and in this embodiment, the centerline 136 of the crossover passageway 102 intersects the vertex 140 of the leading edge feed passage 92.

On the opposite side, the same is true of the crossover passageway 100 albeit from the opposite side of the core 106. In other words, a centerline 144 of crossover passageway 100 must intersect the leading edge feed passage 92 at vertex 140 and leading edge passage 90 at a point forward of a line parallel to the pull angle beta (β) of sliding rib 130. The crossover passageways 100 and 102 are formed by straight ribs 128, 130 with draft angles and sharp corners for more a producible design that allowed for the impingement holes of the passageways 100 and 102 to be accommodated such that they impinge onto desired surfaces while providing an opportunity for the core dies to be pulled. Since the centerline of these crossover passages intersects the vertex 140 and extends at an angle gamma (γ) that is equal to or less than the respective sliding rib pull angles alpha (α) and beta (β), the two halves of the sliding rib can pull apart without core die lock. In other words and if the pull angle alpha (α) is 50 degrees the angle gamma (γ) corresponding to cooling passages 100 must be 50 degrees or less. Similarly and if the pull angle beta (β) is 50 degrees the angle gamma (γ) corresponding to cooling passages 102 must be 50 degrees or less. It is of course understood that the aforementioned angles are merely given for explanatory purposes and various embodiments of the present disclosure are not limited to the above mentioned angles. In yet another alternative embodiment, the angle gamma (γ) corresponding to cooling passages 100 must be less than the pull angle alpha (α) and the angle gamma (γ) corresponding to cooling passages 102 must be less than the pull beta (β).

Figure 8:
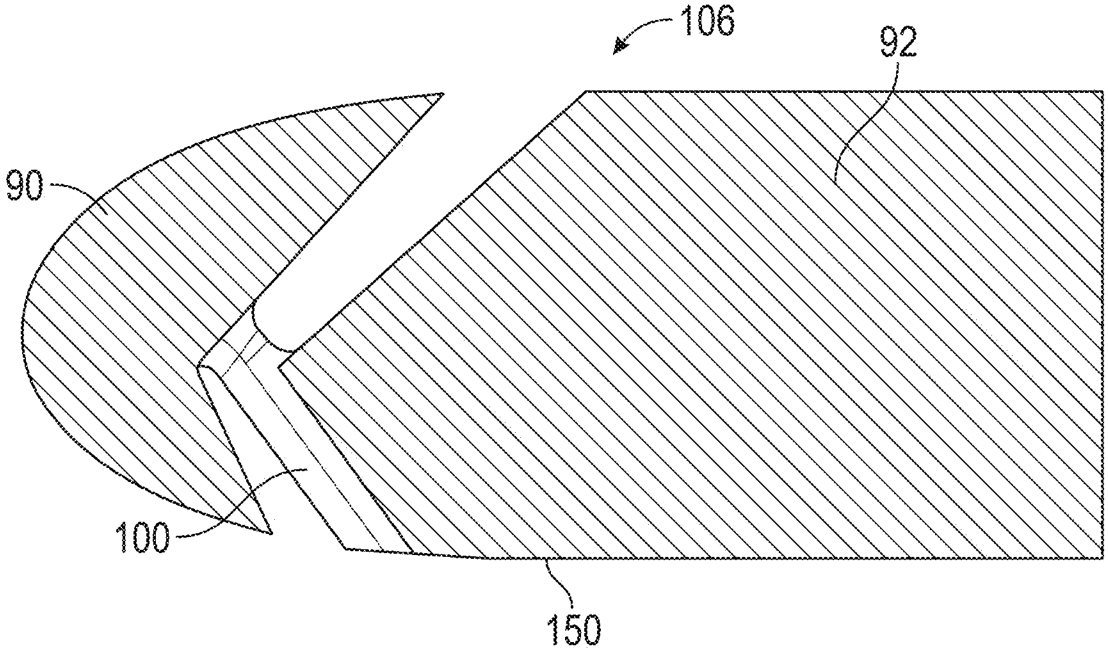
FIGS. 8 and 9 illustrate cross-sectional views of alternative embodiments of the present disclosure.
Figure 9:
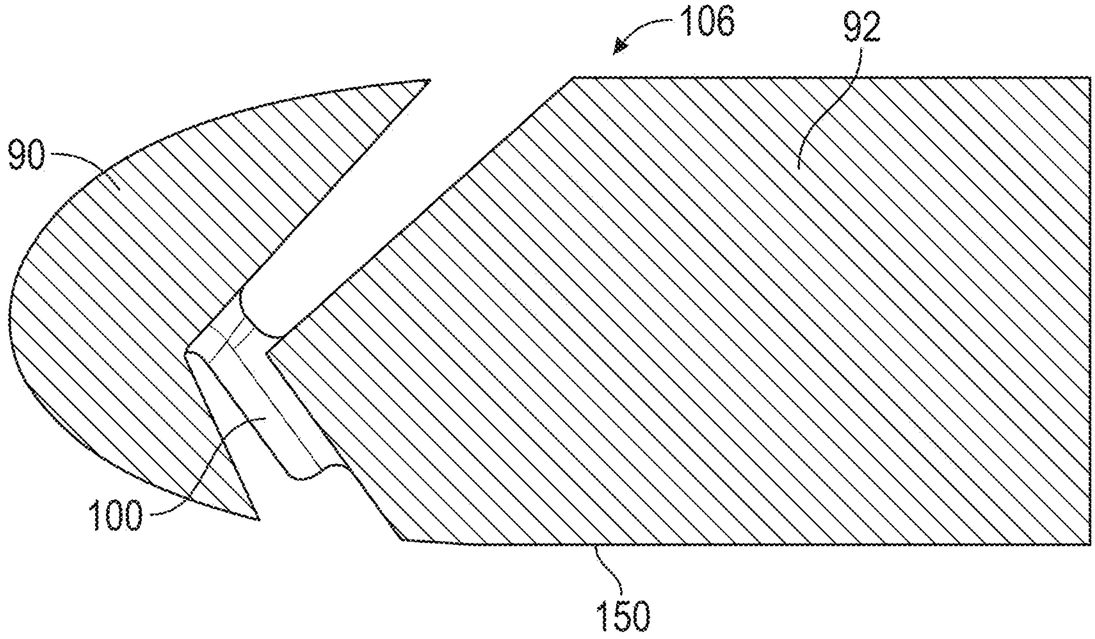

Referring now to FIGS. 8 and 9, alternative configurations of the present disclosure are illustrated. In FIG. 8, the passageway 100 is tapered into the leading edge feed passage 92 and in FIG. 9 the passageway 100 is slightly longer and tapered into the leading edge feed passage 92. Although illustrated in FIG. 9 it is not necessary that the passageway 100 extend all the way to an exterior surface 150 of the portion of core 106 forming the leading edge feed passage 92. Although not illustrated, it is also understood that the same configurations of FIGS. 8 and 9 can be applied to passageways 102 either in combination with passageways 100 or solely applied to passageways 100 or 102.

As used herein, "axially" means a direction having a vector component in the axial direction that is greater than a vector component in the circumferential direction, and "radially" means a direction having a vector component in the radial direction that is greater than a vector component in the axial direction and "circumferentially" means a direction having a vector component in the circumferential direction that is greater than a vector component in the axial direction.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine blade for a gas turbine engine, comprising:

An airfoil, the airfoil having a leading edge, a pressure side, a suction side and a trailing edge;

a plurality of internal cooling cavities including a leading edge cavity, a leading edge feed passage, pressure side cooling passages, suction side cooling passages and main body cavities; the leading edge cavity extending towards the suction side;

a first crossover row of cooling passages providing fluid communication between the leading edge cavity and the leading edge feed passage; and a second crossover row of cooling passages providing fluid communication between the leading edge cavity and the leading edge feed passage, a centerline of the first crossover row of cooling passages is located closer to the pressure side than a centerline of the second crossover row of cooling passages and the centerline of the second crossover row of cooling passages is located closer to the suction side than the centerline of the first crossover row of cooling passages, and wherein the second crossover row of cooling passages are radially staggered relative to the first crossover row of cooling passages and the centerline of the first crossover row of cooling passages and the centerline of the second crossover row of cooling passages intersects the leading edge cavity at a point forward of a line parallel to a pull angle or edge of the leading edge feed passage and the centerline of the first crossover row of cooling passages and the centerline of the second crossover row of cooling passages intersects a vertex of the leading edge feed passage.

2. The turbine blade according to claim 1, wherein the first crossover row of cooling passages and the second crossover row of cooling passages are angled with respect to a horizontal line extending between the leading edge cavity and the leading edge feed passage.

3. The turbine blade according to claim 1, wherein the leading edge cavity proximate to the suction side is provided with an impingement cooling benefit from the second crossover row of cooling passages.

4. The turbine blade according to claim 1, wherein the centerline of the first crossover row of cooling passages and the centerline of the second crossover row of cooling passages are each aligned with an angle gamma (γ) with respect to a horizontal line extending from the vertex of the leading edge feed passage to the vertex of the leading edge cavity, wherein the angle gamma (γ) of the first crossover row of cooling passages is less than or equal to a pull angle alpha (α) of a rib for forming the first crossover row of cooling passages, the pull angle alpha (α) being relative to the horizontal line extending from the vertex of the leading edge feed passage to the vertex of the leading edge cavity and the angle gamma (γ) of the second crossover row of cooling passages is less than or equal to a pull angle beta (β) of a rib for forming the second crossover row of cooling passages, the pull angle beta (β) being relative to the horizontal line extending from the vertex of the leading edge feed passage to the vertex of the leading edge cavity.

5. The turbine blade according to claim 1, wherein the first crossover row of cooling passages and the second crossover row of cooling passages taper into the leading edge feed passage.

6. The turbine blade according to claim 5, wherein at least one of the first crossover row of cooling passages and the second crossover row of cooling passages do not extend all the way to an exterior wall of the airfoil.

7. A gas turbine engine comprising:

a compressor section;

a combustor fluidly connected to the compressor section;

a turbine section fluidly connected to the combustor, the turbine section comprising:

a high pressure turbine coupled to a high pressure compressor of the compressor section via a shaft;

a low pressure turbine; and wherein the high pressure turbine includes a turbine disk with a plurality of turbine blades secured thereto each of the plurality of turbine blades, comprising:

an airfoil, the airfoil having a leading edge, a pressure side, a suction side and a trailing edge;

a plurality of internal cooling cavities including a leading edge cavity, a leading edge feed passage, pressure side cooling passages, suction side cooling passages and main body cavities; the leading edge cavity extending towards the suction side;

a first crossover row of cooling passages providing fluid communication between the leading edge cavity and the leading edge feed passage; and a second crossover row of cooling passages providing fluid communication between the leading edge cavity and the leading edge feed passage, a centerline of the first crossover row of cooling passages is located closer to the pressure side than a centerline of the second crossover row of cooling passages and the second crossover row of cooling passages is located closer to the suction side than the centerline of the first crossover row of cooling passages, and wherein the second crossover row of cooling passages are radially staggered relative to the first crossover row of cooling passages and the centerline of the first crossover row of cooling passages and the centerline of the second crossover row of cooling passages intersects the leading edge cavity at a point forward of a line parallel to a pull angle or edge of the leading edge feed passage and the centerline of the first crossover row of cooling passages and the centerline of the second crossover row of cooling passages intersects a vertex of the leading edge feed passage.

8. The gas turbine engine as in claim 7, wherein the first crossover row of cooling passages and the second crossover row of cooling passages are angled with respect to a horizontal line extending between the leading edge cavity and the leading edge feed passage.

9. The gas turbine engine as in claim 7, wherein the leading edge cavity proximate to the suction side is provided with an impingement cooling benefit from the second crossover row of cooling passages.

10. The gas turbine engine as in claim 7, wherein the first crossover row of cooling passages and the second crossover row of cooling passages taper into the leading edge feed passage.

11. The gas turbine engine as in claim 10, wherein at least one of the first crossover row of cooling passages and the second crossover row of cooling passages do not extend all the way to an exterior wall of the airfoil.

12. A method for forming an airfoil of a turbine blade, comprising:

forming a plurality of internal cooling cavities in the airfoil, the plurality of internal cooling cavities including a leading edge cavity, a leading edge feed passage, pressure side cooling passages, suction side cooling passages and main body cavities; the leading edge cavity extending towards the suction side, the airfoil having a leading edge, a pressure side, a suction side and a trailing edge;

forming a first crossover row of cooling passages providing fluid communication between the leading edge cavity and the leading edge feed passage; and forming a second crossover row of cooling passages providing fluid communication between the leading edge cavity and the leading edge feed passage, a centerline of the first crossover row of cooling passages is located closer to the pressure side than a centerline of the second crossover row of cooling passages and the centerline of the second crossover row of cooling passages is located closer to the suction side than the centerline of the first crossover row of cooling passages, and wherein the second crossover row of cooling passages are radially staggered relative to the first crossover row of cooling passages and the centerline of the first crossover row of cooling passages and the centerline of the second crossover row of cooling passages intersects the leading edge cavity at a point forward of a line parallel to a pull angle or edge of the leading edge feed passage and the centerline of the first crossover row of cooling passages and the centerline of the second crossover row of cooling passages intersects a vertex of the leading edge feed passage.

13. The method of claim 12, wherein the first crossover row of cooling passages and the second crossover row of cooling passages are angled with respect to a horizontal line extending between the leading edge cavity and the leading edge feed passage.

14. The method of claim 12, wherein the leading edge cavity proximate to the suction side is provided with an impingement cooling benefit from the second crossover row of cooling passages.

15. The method of claim 12, wherein the first crossover row of cooling passages and the second crossover row of cooling passages taper into the leading edge feed passage.

* * * * *